United States Patent [19]

Flanigan et al.

[11] 4,094,218

[45] June 13, 1978

[54] HYDRAULIC SYSTEM FOR TENSIONING BAND SAW BLADES

[75] Inventors: Richard J. Flanigan; Robert Duane Hooton, both of McMinnville, Tenn.

[73] Assignee: Houdaille Industries, Inc., Buffalo, N.Y.

[21] Appl. No.: 764,000

[22] Filed: Jan. 31, 1977

[51] Int. Cl.² .................. B27B 13/14; B23D 55/10; B27B 13/08
[52] U.S. Cl. ............................... 83/62.1; 83/819
[58] Field of Search ............. 83/58, 62 R, 62.1, 819, 83/818

[56] References Cited

U.S. PATENT DOCUMENTS 2,607,373   8/1952   Crane .................................. 83/62.1

*Primary Examiner*—Donald R. Schran
*Attorney, Agent, or Firm*—Hill, Gross, Simpson, Van Santen, Steadman, Chiara & Simpson

[57] ABSTRACT

A closed hydraulic system for band saws transmits manually actuated control of the saw blade tension, provides for easy and remote reading of blade tension, instantly stops rotation of the upper saw blade wheel in case of blade breakage, shuts off the motor drive when blade breakage occurs, and prevents restarting of the motor until a new blade is installed and tension is applied thereto. The upper idler blade band wheel is equipped with a spring loaded brake held in a non-braking position by hydraulic fluid which is pressurized from a manually actuated crank which shifts the upper wheel to apply tension to the saw blade band and when the band breaks to release the tension, the fluid pressure drops sufficiently to allow the springs to actuate the brake for stopping the wheel. At the same time, a fluid pressure actuated switch in the electric circuit for the driving motor is opened to prevent restarting of the motor until tension is once again applied to a new saw band.

15 Claims, 8 Drawing Figures

4,094,218

HYDRAULIC SYSTEM FOR TENSIONING BAND SAW BLADES

FIELD OF THE INVENTION

This invention relates to the art of fail-safe systems for band saws and the like wheel driven bands or belts and particularly deals with a closed hydraulic system transmitting manually applied tension loads on the upper idler wheel of a band saw to stop the rotation of the idler wheel, when the band saw breaks and to prevent restarting of the motor drive until tension is applied to a new band saw blade.

PRIOR ART

Heretofore provided band saws included electric motor driven lower wheels and upper idler wheels receiving the saw band therearound. The upper wheels of such saw were shiftable toward and away from the lower wheels to control the saw blade tension. The upper wheel was freely rotatable and continued to spin resulting in a wheel and band tire destruction as well as imparting a dangerous flinging to the broken band saw blade.

SUMMARY OF THIS INVENTION

According to this invention, a closed hydraulic system is applied to a band saw for eliminating heretofore encountered destruction and safety hazards in the event of breakage of the saw blade. The invention increases the safety and lessens the operation costs of band saws and since it is used continually during the operation of the band saw, it adds a great advantage over infrequently used stand-by safety systems which fail to operate when needed due to long periods of nonuse.

In a preferred embodiment of the invention, the upper idler wheel of a band saw is carried by a vertically shiftable slide which is raised and lowered by a manually actuated screw to apply tension to the band saw which is trained around the the wheel and also around a motor driven wheel. The screw is bottomed on a piston which is supported by hydraulic fluid in a closed pipeline system. The idler wheel has a brake drum surrounded by spring loaded brake shoes and fluid in the closed system also supports pistons in the brake shoes to compress the springs and hold the brake shoes off of the brake drum. The pipeline for the closed hydraulic system also includes a pressure gage and a pressure operated electrical switch in the electric circuit for the motor drive of the lower wheel.

When the screw is manually cranked to raise the top idler wheel it applies tension to the saw blade trained therearound. Since the screw lift for the idler wheel is bottomed on hydraulic fluid in the closed circuit, this fluid will be placed under pressure and the pressure gage will immediately register the applied tension load on the blade so that the operator can conveniently and quickly make proper tension adjustments. The fluid under pressure at the same time holds the spring loaded brake shoe in spaced relation from the brake drum and holds the pressure switch in the electric motor drive circuit in closed position. Immediately upon release of the applied tension as by breakage of the band saw blade or upon derailing of the blade from the tires of the idler wheel or driven wheel, the screw loaded piston will be released to unload the fluid in the closed hydraulic circuit whereupon the springs will cause the brake shoes to engage the brake band to instantly stop the idler wheel and to cause the pressure actuated electric switch to open for stopping the motor. The motor cannot again be restarted until tension is again applied to a reinstalled saw blade.

Since the band saw can only operate when fluid in the closed hydraulic circuit is under pressure, the closed hydraulic system of this invention is fail-safe because it must remain in continuous use and cannot become inoperative because of long periods of nonuse such as occur in any stand-by safety system.

It is then an object of this invention to provide a simplified inexpensive safety system for wheel driven bands and belts.

A further object of this invention is the provision of a tension control system for bands and belts, such as band saw blades, in which the applied tension is shown by an indicator that may be remotely mounted for convenient reading.

Another object of this invention is to provide a closed hydraulic circuit for band saws which will instantly stop the idler band saw wheel and shut off power to the motor driven band saw wheel upon release of saw blade tension.

A specific object of the invention is to provide a band saw with a closed hydraulic system wherein blade or saw band tension is accurately controlled by manually actuated hydraulic pressure and wherein the dangers of free spinning wheels are eliminated.

Another specific object of this invention is to provide a band saw with a manual tension screw control for the upper idler wheel wherein the screw also loads a closed hydraulic system which allows free rotation of the upper wheel and driving of the lower wheel only when a predetermined minimum tension is applied to the band saw blade.

Other and further objects of this invention will be apparent to those skilled in this art from the following detailed description of the annexed sheets of drawings which, by way of a preferred example only, illustrate one embodiment of the invention.

ON THE DRAWINGS

AS SHOWN ON THE DRAWINGS

Figure 1:
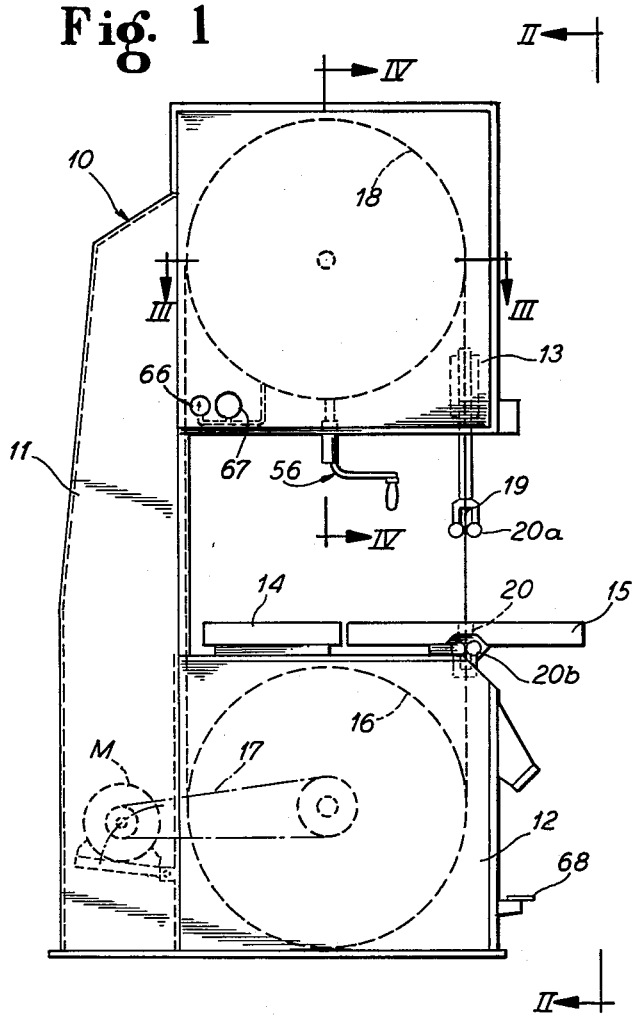
FIG. 1 is a front elevational view with parts somewhat diagrammatically shown, of a band saw according to this invention.
Figure 2:
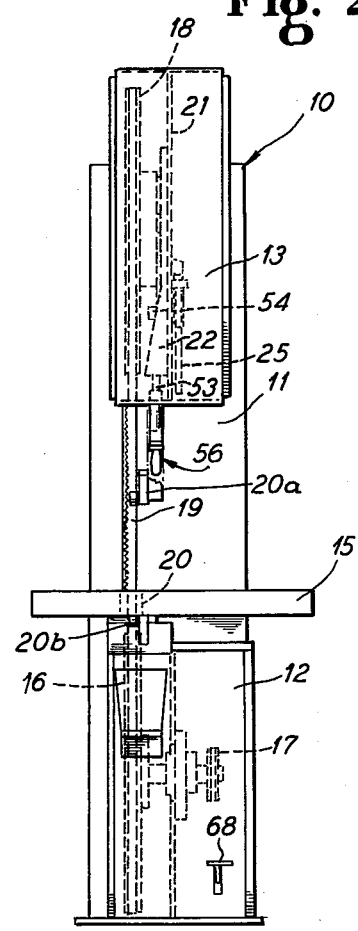
FIG. 2 is an end elevational view of the band saw of FIG. 1 taken generally along the lines II—II of FIG. 1.

The band saw 10 of FIGS. 1 and 2 includes an upright support frame 11, a bottom console 12, a top console 13, a fixed horizontal workpiece receiving table 14 on top of the console 12 and a tiltable workpiece receiving table 15 outboard from the table 14.

A lower saw blade drive wheel 16 is rotatably mounted in the lower console 12 and is driven through a belt 17 from an electric motor M mounted in the upstanding frame 11.

An upper idler wheel 18 is rotatably mounted in the console 13. A band saw blade 19 is trained around the wheels 16 and 18 and extends across the space between the upper and lower consoles 12 and 13 with a driving run extending through a slot 20 in the table 15 and guided by upper and lower console mounted guides 20a and 20b. The return run of the blade extends through the pedestal 11.

Figure 3:
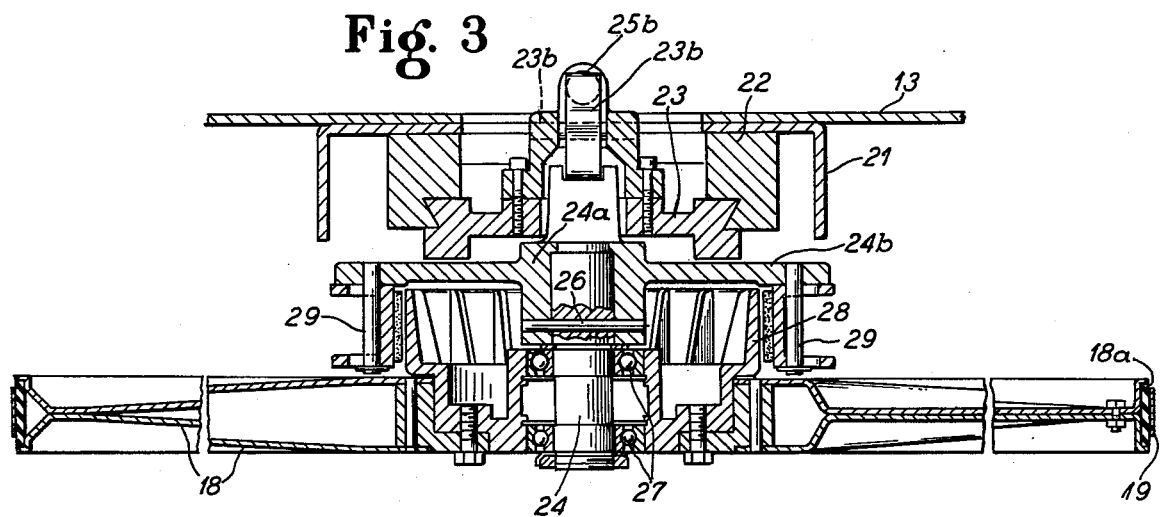
FIG. 3 is a transverse cross-sectional view of the band saw taken along the lines III—III of FIG. 1 with the components shown in detail.
Figure 4:
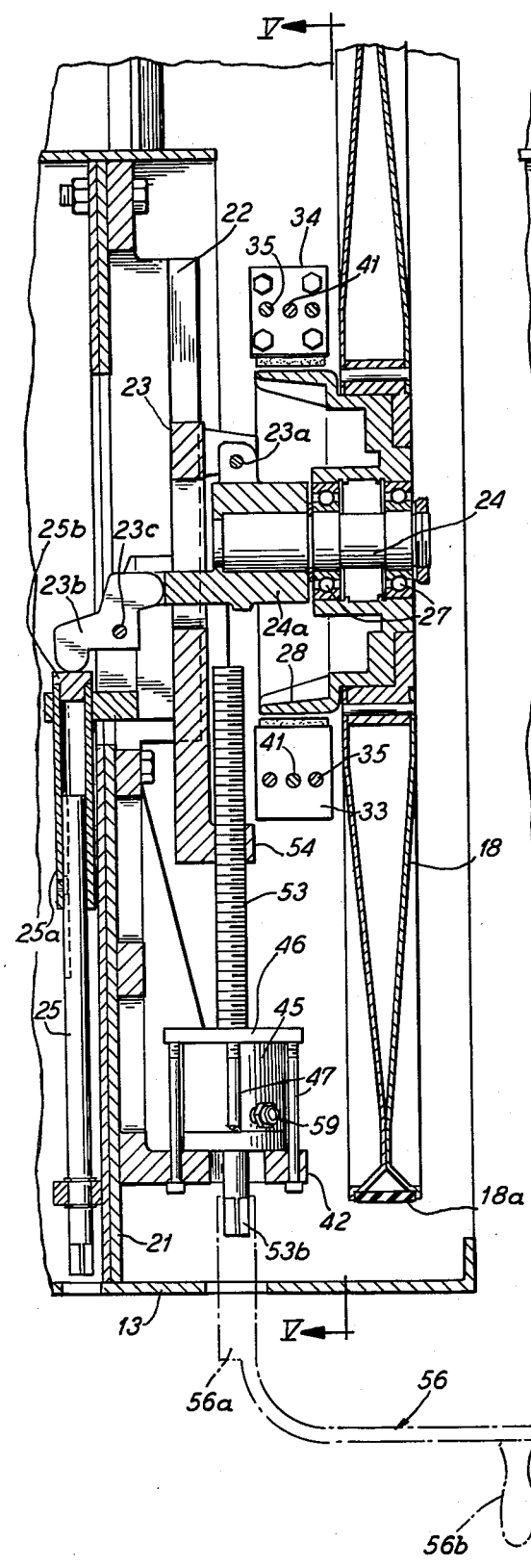
FIG. 4 is a longitudinal cross-sectional view taken generally along the lines IV—IV of FIG. 1 with parts shown in detail.

The console 13, as shown in FIGS. 3 and 4, houses a rigid upstanding channel frame 21 supporting a guide track 22 for a vertical slide 23 from which is pivotally suspended on pin 23a, a shaft housing 24a for a forwardly projecting axle 24. The shaft housing 24a is bottomed against a rocker arm 23b pivoted on the slide 23 by a pin 23c and a vertical screw 25 rotatably mounted on the back of the frame 21, raises and lowers a tube 25a threaded thereon and carrying a top pad 25b on which the rocker arm 23b rests. The shaft 24 is thus tilted relative to the slide 23. The shaft housing 24a also has a brake shoe plate 24b radiating therefrom. The housing 24a is fixed to the axle 24 adjacent the slide 23 by a pin 26 and outboard of which are mounted on the axle, antifriction bearings 27 rotatably carrying the idler wheel 18.

A brake drum 28 is mounted on the idler wheel 18 around the axle 24 adjacent the brake plate 24b and pins 29 secured to the plate 24b near its periphery project therefrom alongside of the brake drum 28.

Figure 5:
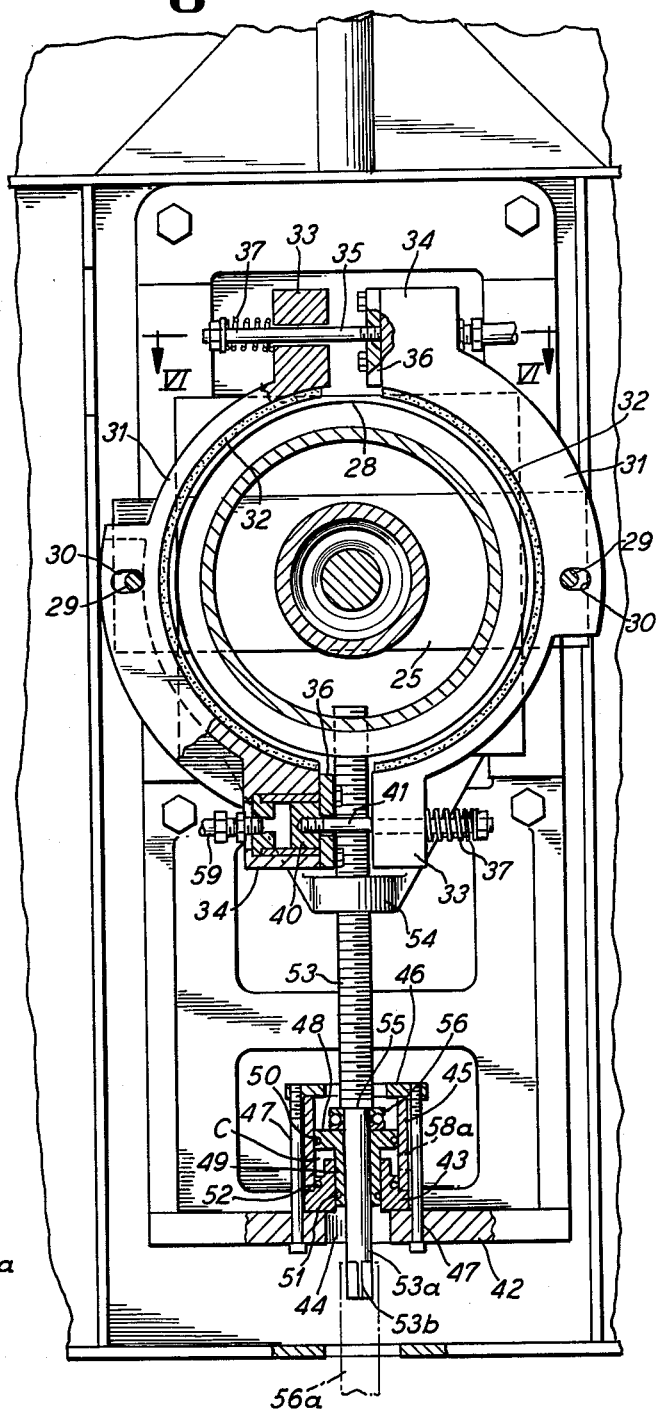
FIG. 5 is a cross-sectional view taken generally along the lines V—V of FIG. 4.
Figure 6:
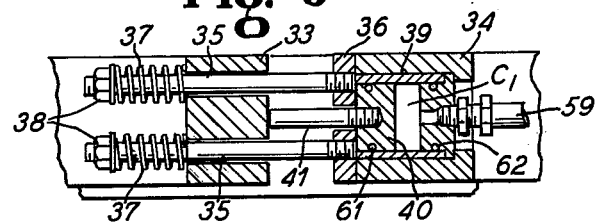
FIG. 6 is a cross-sectional view taken along the lines VI—VI of FIG. 5.

As shown in FIG. 5, these pins 29 project through slots 30 in brake shoes 31 which embrace the brake drum 28. The brake shoes 31 are semicylindrical and carry brake linings 32 on their inner peripheries to engage the periphery of the brake drum. Each brake shoe 31 has a laterally projecting centrally apertured lug 33 and a hollow lug 34 confronting the lug 33 of the opposite brake shoe. A pair of pins 35 extend through the apertures in each lug 33 as best shown in FIG. 6 and are threaded in a plate 36 bolted to the face of the adjoining lug 34. Compression springs 37 surround each pin 35 and are compressed between the outer face of the lug 33 and nuts 38 threaded on the pins. These springs 37 will draw the brake shoes 31 toward each other to apply the brake lining 32 to the brake drum 28. The springs 37 can be replaced with any other suitable means for biasing the shoes 31 to a braking condition.

Each lug 34 has a cup-shaped liner 39 seated in the hollow interior thereof and slidably mounting a piston 40 into which is threaded a piston rod pin 41 with slides through a central aperture in the plate 36 and is adapted to abut the opposing lug 33. As will be hereinafter more fully described, when the piston is loaded by pressured fluid, the pin 41 thrusts against the lug 33 to oppose the action of the springs 37 and separate the brake shoes 31 to maintain them in spaced relation from the brake drum.

As best shown in FIGS. 4 and 5, the frame 22 has a horizontal bottom flange 42 supporting a bearing boss 43 over a central aperture 44. A cylindrical casing 45 is bottomed on the boss 43 and is covered by a centrally apertured top plate 46. Draw bolts 47 extending through the flange 42 and surrounding the casing 45 are threaded into the end plate 46 to clamp the casing between the plate and the bearing boss 43.

A hollow head piston 48 having a hollowed depending stem 49 is slidably mounted in the casing 45 with the stem slidable through the boss 43. An O-ring seal 50 surrounding the piston head rides on the casing wall 45 to prevent leakage passed the piston head. A similar seal 51 surrounds the stem 49 and sealingly engages the wall of the bearing boss 43 to prevent leakage between the stem and boss. A third seal ring 52 surrounds the boss 43 and engages the cylindrical casing 45.

An upstanding screw rod 53 is threaded through a bottom flange 54 on the slide 23 and has a shoulder 55 bottomed on a bearing 56 which is supported on the piston head 48. The reduced diameter portion 53a of the screw rod 53 beneath the shoulder 55 extends snugly through the piston head 48 and the depending piston stem 49 and freely through the aperture 44 of the flange 42. The bottom end of this reduced diameter rod portion 53a is splined or keyed at 53b. A hand crank 56 has an upstanding socket portion 56a secured to this end 53b of the screw rod and depending therefrom through an aperture in the bottom wall of the console 13. A handle 56b on the crank is thus conveniently available to turn the crank for rotating the screw rod to raise and lower the slide 23. This same crank 56 can be used to rotate the screw rod 25 for tilting the axle or shaft housing 24a to control "tracking" of the saw blade on the wheel 18.

Figure 7:
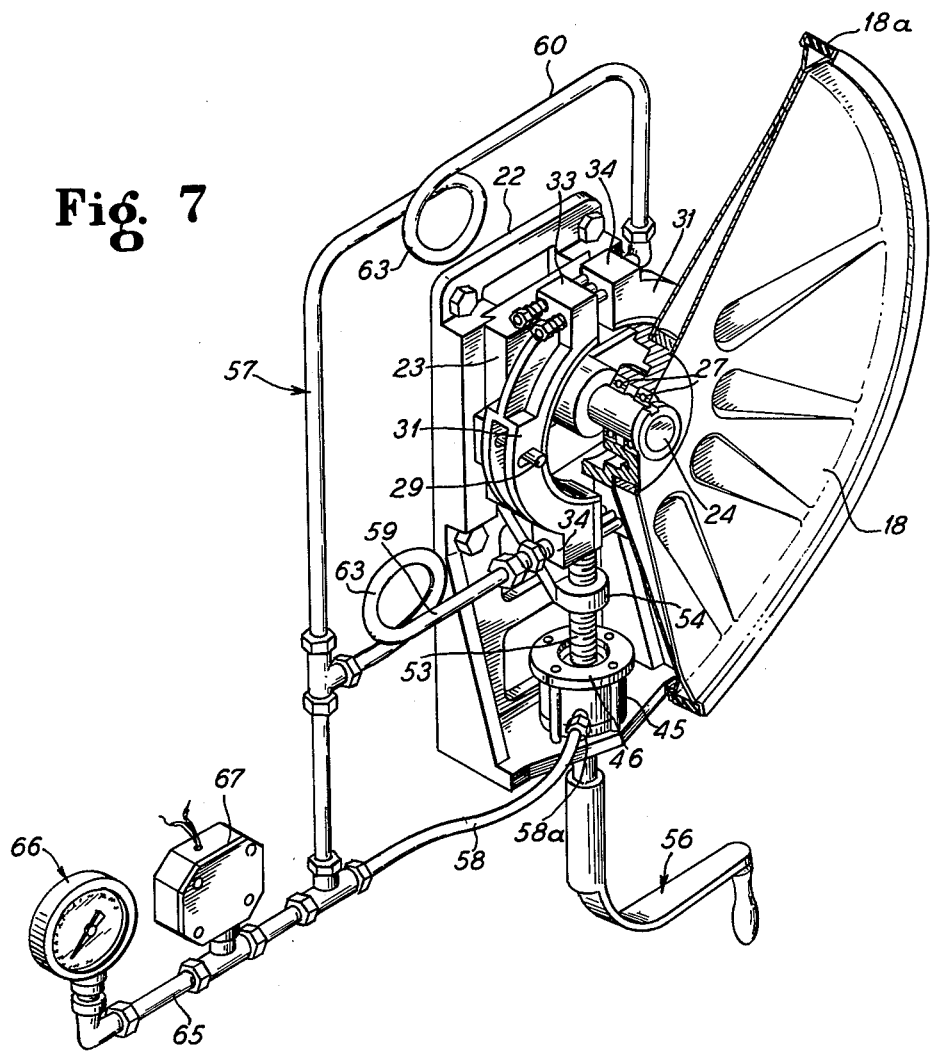
FIG. 7 is a perspective view of the upper band saw idler wheel together with its mounting and the closed hydraulic circuit of this invention.

As best shown in FIG. 7, a closed hydraulic fluid containing pipeline 57 has a first branch 58 coupled at 58a with the casing 45 to communicate with a Chamber C under the piston head 48 to support the piston on a column of hydraulic fluid as indicated in FIG. 5. Second and third branches 59 and 60 of the pipeline 57 are coupled respectively to the bottom and top lugs 34 of the brake shoes 31 to communicate, as shown in FIG. 6, with a Chamber $C_1$ underlying the piston 40 in each cup-shaped liner 39 carried by the lug 34. A seal ring 61 surrounds the piston 40 and a seal ring 62 surrounds the end wall of the sleeve member 39 to prevent leakage from the Chamber $C_1$.

The branch tubings 59 and 60 have loops 63 therein to accommodate limited movement of the ends thereof which are coupled to the lugs 34.

A fourth branch 65 in the pipeline conduit 57 supports a pressure indicating gauge 66 and a pressure actuated electrical switch 67. The gauge 66 can be positioned remotely of the band saw 10, if desired, for convenient reading.

Figure 8:
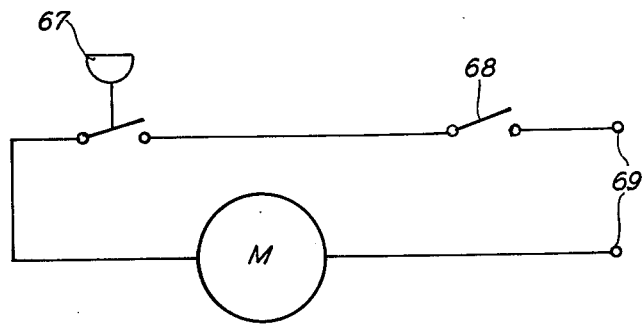
FIG. 8 is a diagrammatic circuit view of the electric motor drive for the lower band saw wheel.

As shown in FIG. 8, the switch 67 is in an electric circuit containing the motor M for driving the bottom wheel 16 as described above. A push button switch 68 is also provided in the circuit and current is supplied from terminals 69 to drive the motor M only when the switches 67 and 68 are closed.

OPERATION

The pipeline 57 is filled with a hydraulic fluid such as a conventional fluid transmission oil, the hand crank 56 is placed on the screw rod 53 and rotated to lower the slide 23 and the idler wheel 18, a band saw blade 19 is looped over the driven wheel 16 and idler wheel 18 and is centered on the compliant plastic or rubber tire 18a thereof. The screw rod 25 can be rotated by the crank 56 to proper "track" the saw blade on the wheels. The hand crank 56 is then rotated to cause the screw rod 53 to raise the slide 23 with the screw rod being supported on the bearing 56 which in turn is supported by the piston 48. Fluid in the Chamber C underlying the piston 48 will thus be loaded to carry the weight of the upper idler wheel 18 and its supporting structure. As the wheel 18 is raised to apply tension to the band saw blade 19, the fluid in the pipeline 57 will be pressured by the piston 48 and will flow into the Chambers $C_1$ to act on the pistons 40 for thrusting the pins 41 against the opposing lugs 33 thereby compressing the springs 37 and separating the brake shoes 31 to space the brake linings 32 away from the brake drum 28. The loops 63 in the branch tubings 59 and 60 accommodate movement of the brake shoes 31 and 32 toward and away from each other and also accommodate raising and lowering of the slide 23 and the wheel structure supported thereon.

Pressure of the hydraulic fluid in the closed pipeline 57 can be read from the gauge 66 and the pressure switch 67 can be set to close only when a predetermined minimum pressure has been reached. The gauge 66 can be calibrated in terms of tension applied to the saw blade 19 and optimum operating tensions for various sizes of saw blades are easily and quickly achieved.

Since the slide 23 is supported vertically only through the screw rod 53, and since this screw rod is bottomed on a column of hydraulic fluid in the Chamber C, and since the fluid supporting the weight of the assembly and the tension applied to the saw band must be sufficient to pressure the fluid for causing the pistons 40 to compress the springs 37 and release the brake shoes from the brake drum, it follows that any release of this pressure sufficient to unload the springs 37 and the pressure switch 67, as when the saw blade breaks or runs off of either wheel 16 or 18 will permit the springs 37 to clamp the brake linings 32 and will open the pressure switch 67. As long as the fluid in the closed system is under sufficient pressure to hold the motor switch closed the brake will be released. Upon release of this pressure, the wheel 18 will instantly stop and power input to the motor M will be shut off. Prompt stoppage of the wheels 16 and 18 prevents their tires, such as 18a, from being damaged and eliminates destruction of the saw blade and flinging of the blade out of the machine.

Since the closed hydraulic system is always in use to support the tension load on the saw band, this invention provides a built-in fail-safe arrangement which instantly stops the wheels of band saws upon release of band saw tension.

We claim as our invention:

1. In a machine having spaced wheels driving a band trained therearound and at least one wheel being shiftable relative to another wheel to control tension of the band, the improvements of a closed hydraulic conduit having fluid sealed therein, adjustable means supported on fluid from said conduit adapted to be set to position said one wheel and simultaneously load said sealed fluid, hydraulic brake means for said one wheel biased to open position with loaded fluid from said conduit, and means biasing said brake means to closed position for stopping rotation of said one wheel whenever fluid pressure in said conduit falls below a predetermined minimum.

2. A machine tool having an electric motor driven wheel, an idler wheel spaced from said driven wheel, a band trained around said wheels to be driven by said driven wheel, means for shifting said idler wheel relative to said driven wheel to control the tension of said band, a hydraulic support for said means including a closed hydraulic conduit with fluid sealed therein and loaded by said means for shifting said idler wheel, a pressure switch closed by loaded hydraulic fluid in said conduit to maintain the motor drive to said driven wheel, a hydraulic brake for said idler wheel, means biasing said brake into a braking position, and said brake having a piston controlled by the loaded hydraulic fluid for biasing the brake to a nonbraking position when pressure of the hydraulic fluid is sufficient to hold said switch in a closed position.

3. A band saw which comprises a frame, a vertical driving wheel rotatably mounted on said frame, a vertical idler wheel rotatably mounted on said frame above said driving wheel, said wheels having aligned tires thereon for receiving a band saw blade therearound, means for raising and lowering said idler wheel toward and away from said driving wheel to control tension of a band saw blade trained around the tires of said wheels, a spring-loaded brake for said idler wheel, piston means acting on the spring-loaded brake for releasing the brake, piston means supporting the means for raising and lowering the idler wheel, an electric motor for driving said driven wheel, a pressure actuated switch controlling said electric motor, and a closed hydraulic conduit communicating hydraulic fluid between said piston means to unload the brake and said means supporting the tension means and said pressure switch, thereby allowing the springs to tighten the brake for stopping the idler wheel and allowing the switch to open for stopping the electric motor whenever fluid pressure in the conduit falls below a predetermined minimum.

4. The machine of claim 1 wherein the means biasing the hydraulic brake means to closed position is spring means.

5. The machine of claim 4 wherein the spring biased brake means include a pair of brake shoes embracing a brake drum which are pressed against the brake drum by said spring means and are released from the brake drum by pistons receiving loaded fluid from said conduit.

6. The machine of claim 1 including a motor drive for one of said wheels and a switch controlling said motor drive loaded to closed position by said sealed fluid and biased to open position upon release of fluid pressure in said conduit.

7. The machine of claim 1 wherein said adjustable means supported on fluid from said conduit includes a manually rotated screw supported on a column of fluid controlling the tension load on said band.

8. The machine of claim 2 wherein said means for shifting said idler wheel is a manually rotated screw and a piston supported on a column of hydraulic fluid to form said hydraulic support.

9. The machine tool of claim 2 wherein the hydraulic support is a piston slidably mounted in a chamber receiving fluid from said hydraulic conduit and a manually rotated screw is supported on said piston to shift said idler wheel.

10. The machine tool of claim 2 including an upright track, a slide vertically shiftable on said track, an axle projecting from said slide, bearings freely supporting said idler wheel on said axle, a brake drum carried by said wheel, brake shoes fixed to said axle surrounding said brake drum, springs biasing said brake shoes toward said drum, pistons opposing said springs to hold the brake shoes spaced from said drum, a screw rod supporting said slide adapted to be manually rotated to shift said slide in said track, a piston supporting said screw rod, and said closed hydraulic conduit communicating with the brake shoe pistons and the screw rod piston whereby rotation of said screw rod to apply tension to the band trained around said wheel will load the hydraulic fluid in said conduit to maintain the slide in its adjusted position and to hold the brake shoes away from the brake drum.

11. The band saw of claim 3 wherein the frame supports top and bottom consoles in spaced relation, the bottom console supports a workpiece table, the band saw blade has a driving run extending through the workpiece table, the means for raising and lowering the idler wheel in a vertical screw rod, and a handle on said rod projects below said top console for easy access.

12. The band saw of claim 3 wherein the tires are compliant and the means for raising and lowering the idler wheel is a manually rotated screw rod.

13. The band saw of claim 3 wherein the closed hydraulic conduit has a first branch communicating with the piston means supporting the means for raising and lowering the idler wheel, a second branch communicating with one brake shoe of the spring loaded brake, a third branch communicating with the other brake shoe of the spring-loaded brake, and a fourth branch containing the pressure actuated switch.

14. The band saw of claim 3 including a readily visible pressure gauge in said hydraulic conduit for showing the tension on the saw blade.

15. The machine tool of claim 2 including means for tilting the idler wheel to center the band on the wheels.

* * * * *